United States Patent [19]

Rhee et al.

[11] Patent Number: 4,933,149
[45] Date of Patent: Jun. 12, 1990

[54] FLUIDIZED BED POLYMERIZATION REACTORS

[75] Inventors: Seung J. Rhee, South Somerville, N.J.; Larry L. Simpson, South Charleston, W. Va.

[73] Assignee: Union Carbide Chemicals and Plastics Company Inc., Danbury, Conn.

[21] Appl. No.: 780,273

[22] Filed: Sep. 26, 1985

Related U.S. Application Data

[63] Continuation-in-part of Ser. No. 643,882, Aug. 24, 1984, abandoned.

[51] Int. Cl.[5] ............................................. B01J 8/18
[52] U.S. Cl. .................................... 422/131; 422/139; 422/220; 422/310
[58] Field of Search ............... 422/131, 132, 135, 139, 422/140, 220; 366/101, 106, 107; 261/123

[56] References Cited

U.S. PATENT DOCUMENTS

| | | |
|---|---|---|
| 1,141,266 | 6/1915 | Raschig . |
| 2,381,119 | 8/1945 | Dill ...................................... 422/220 |
| 2,550,374 | 4/1951 | Palmer . |
| 2,612,437 | 9/1952 | Kaulakis . |
| 2,651,565 | 9/1953 | Bergman . |
| 2,657,121 | 10/1953 | Rollins . |
| 2,665,976 | 1/1954 | Rhys, Jr. . |
| 2,690,962 | 10/1954 | Clarke . |
| 3,002,963 | 10/1961 | Czenkush et al. . |
| 3,298,792 | 1/1967 | DiDrusco . |
| 3,479,146 | 11/1969 | Hochmann et al. . |
| 3,787,188 | 1/1974 | Lyon . |
| 3,790,550 | 2/1974 | Miller ................................ 422/135 |
| 3,824,081 | 7/1974 | Smith et al. . |
| 3,848,811 | 11/1974 | Fryback . |
| 3,887,337 | 6/1975 | Descamps et al. . |
| 3,931,134 | 1/1976 | Hartmann et al. . |
| 4,126,539 | 11/1978 | Derr, Jr. et al. . |
| 4,140,625 | 2/1979 | Jensen . |
| 4,200,715 | 4/1980 | Lynch et al. . |
| 4,233,269 | 11/1980 | Kaye et al. . |
| 4,259,925 | 4/1981 | Barnert et al. . |
| 4,374,094 | 2/1983 | Farnham . |

FOREIGN PATENT DOCUMENTS

| | | |
|---|---|---|
| 0071430 | 2/1983 | European Pat. Off. . |
| 919359 | 2/1963 | United Kingdom ................ 422/139 |

Primary Examiner—Michael S. Marcus
Attorney, Agent, or Firm—Clement J. Vicari

[57] ABSTRACT

A fluidized bed reactor and operating process is disclosed, the reactor including a distributor plate to provide distribution of fluid passing upwardly into a fluidized bed; a mixing chamber positioned below the distributor plate; fluid entry conduits, preferably at the base of the reactor, for the passage of fluid into the reactor; and a flow deflector associated with the entry conduit for providing at least an upwardly fluid flow path and an outward fluid flow path along the wall of the mixing chamber to inhibit the accumulation of solids and liquid in the mixing chamber.

3 Claims, 7 Drawing Sheets

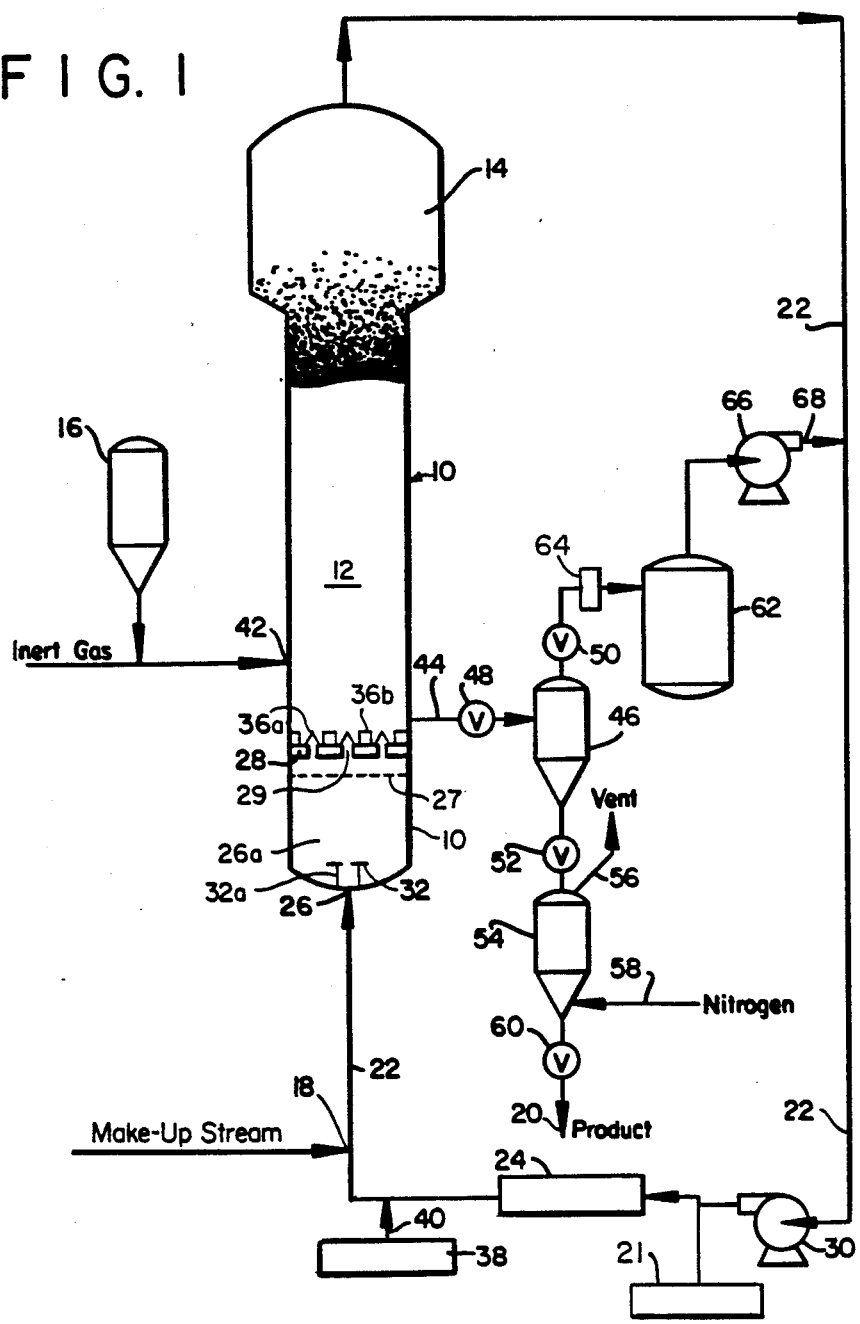

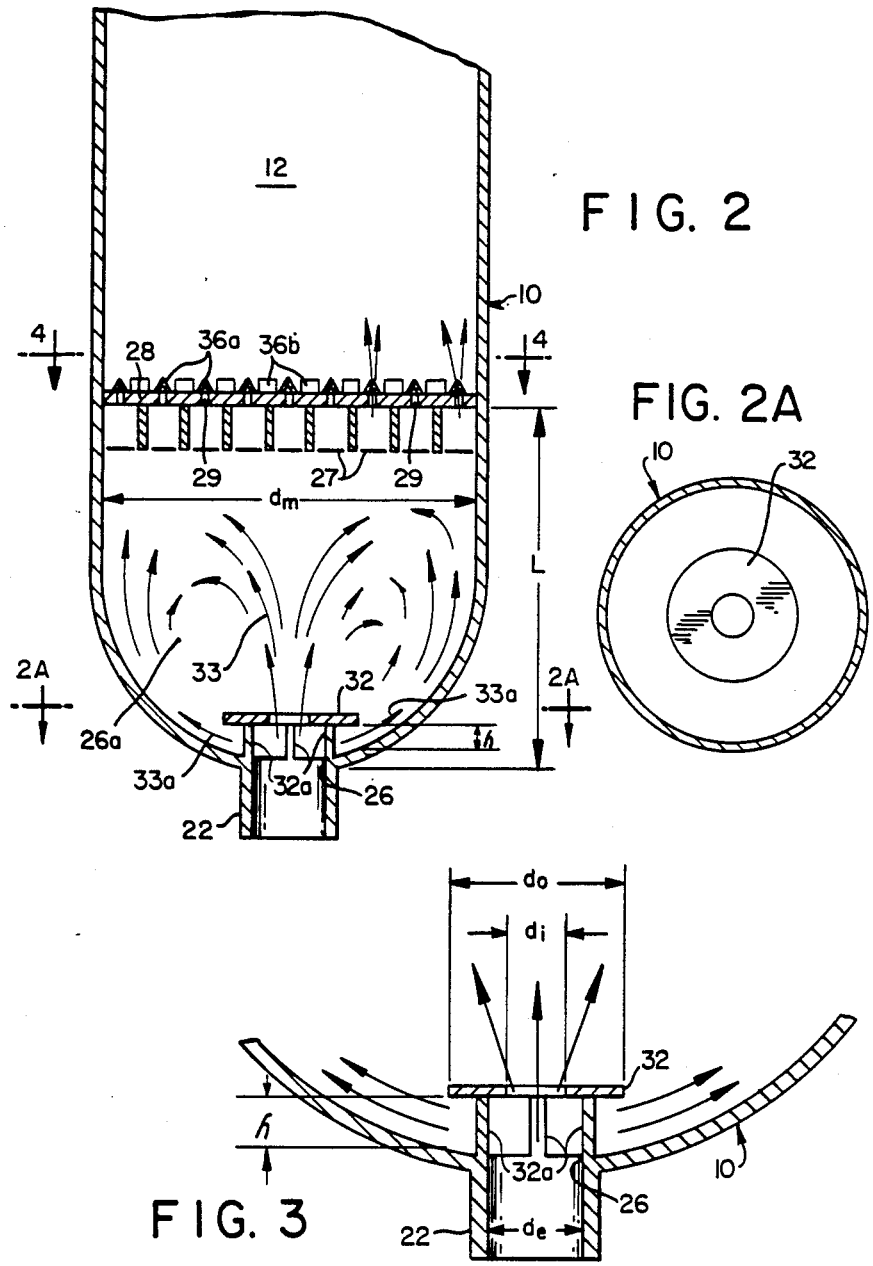

FLUIDIZED BED POLYMERIZATION REACTORS

This application is a continuation in part of application Ser. No. 643882 filed Aug. 24, 1984, now abandoned.

1. Technical Field:

The present invention relates to fluidized bed polymerization reactors. More particularly, it relates to improvements in fluidized bed polymerization reactors and the distribution of fluid introduced into such reactors.

2. Background Art:

The discovery of the fluidized bed process for the production of polymers provided a means for producing a diversity of polymers, e.g., polyolefins such as polyethylene, with a drastic reduction in capital investment and a dramatic reduction in energy requirements as compared to the conventional processes. However, a limiting factor in the use of a fluidized bed reactor for carrying out an exothermic polymerization process is the rate at which heat can be removed from the bed.

The most common and perhaps universal means of heat removal employed in conventional fluidized bed reactor processes is by compression and cooling of the recycle gas stream at a point external to the reactor. In commercial scale fluidized bed reaction systems for producing polymers such as polyethylene, the amount of fluid which can be circulated to remove the heat of polymerization is greater than the amount of fluid required for support of the fluidized bed and for adequate solids mixing in the fluidized bed. However, the fluid velocity in the reactor is limited due to the need to prevent excessive entrainment of solids in the fluidizing gas stream as it exits the reactor. Necessarily then, the amount of fluid which can be circulated to remove heat is similarly limited.

One method of increasing the rate of heat removal is to compress and cool the monomeric gases recycled to the reactor to a point where a portion thereof is condensed. The resulting liquid portion is entrained in the recycled monomeric gas stream and carried back to the reactor. Such operation has been referred to as the "condensing mode" of polymerization operation and is disclosed in prior U.S. application Ser. No. 361,547, filed Mar. 24, 1982 and in contemporaneously filed U.S. patent application of J. M. Jenkins et al. Ser. No. 643,884 filed Aug. 24, 1984, entitled "Improved Method for Fluidized Bed Polymerization", both of which are assigned to the same assignee and both of which are incorporated herein by reference. As there disclosed, the employment of the condensing mode of operation permits a reduction in the temperature of the recycle stream, which, in combination with the heat of vaporization of the liquid, results in a marked increase in space-time-yield over that obtainable in the "non-condensing mode" of operation where the temperature of the recycled gas stream is maintained above the dew point of the recycle stream, the dew point being the temperature at which liquid condensate begins to form in the gas stream.

Test results from a scale model bottom reactor head and experience with a commercial polymerization reactor have indicated that an open nozzle-type reactor inlet is satisfactory for successful operation of a fluidized bed reactor in the condensing mode while a standpipe/conical cap-type reactor inlet is satisfactory for a non-condensing mode of operation of the reactor. The standpipe/conical cap-type inlet is not satisfactory for a condensing mode of operation due to liquid flooding or frothing in the bottom head, a phenomenon experienced with commercial reactors at relatively low levels of liquid in the recycle stream. Conversely, the open nozzle-type inlet has been found to be unsatisfactory for a non-condensing mode of operation in a commercial reactor because of excessive build-up of resin solids in the bottom head, particularly around the inlet opening.

In the practical operation of large commercial production reactors it is sometimes desireable to switch from a non-condensing mode of operation to a condensing mode of operation and vice versa. To do this in the past, for the reasons given above it has been necessary to shut down the reactor to replace or alter the inlet to conform with the requirements of the new mode of operation. Reactor shutdown for the transition is undesirable not only because of the maintenance costs associated with the changeover, but because the downtime results in significant production losses. For some commercial reactors, the transition may be required frequently, depending upon production schedules. Consequently, it is highly desirable to have an all-purpose reactor inlet configuration which satisfies the requirements for both the condensing and non-condensing modes of reactor operation.

The objectives of the invention, then, are to (1) augment the production rates of fluidized bed reactors, (2) lower the cost for the maintenance and/or operation of such reactors, and (3) provide flexibility to enable such reactors to produce a variety of polymers, e.g., polymers of ethylene and heavier alpha olefins (copolymers and terpolymers) and polymers of propylene (homopolymers and block or random copolymers) at higher than conventional production rates without incurring downtime production losses. The flow deflector means of the present invention assists in meeting these objectives by providing a multi-purpose reactor inlet configuration which eliminates the need for reactor shutdown when converting from the condensing mode to the non-condensing mode of operation and vice versa.

DISCLOSURE OF THE INVENTION

In accordance with the present invention, a fluidized bed polymerization reactor is provided having distributor plate means below the fluidized bed region defining a mixing chamber within the reactor in the region below the distributor plate means and one or more entry means for passage of fluid into the reactor and through the mixing chamber. At least one flow deflector means is positioned below the distributor plate means and is associated with at least one of the entry means. The flow deflector means is adapted to provide at least two fluid flow paths for fluid entering the mixing chamber, a first fluid flow path along the wall of the mixing chamber, and a second upwardly oriented fluid flow path wherein, in operation, solid particles and liquid droplets, if any, in or coming into the second flow path are carried upward; the wall of the mixing chamber is swept to inhibit the build-up of such solid particles; and the accumulation of liquid in the mixing chamber is also inhibited.

The preferred flow deflector means is an annular flow deflector having aperture means for providing a central, upwardly oriented fluid flow path and means for providing peripheral flow around the flow deflector means and along the wall of the mixing chamber. By the operation of such a flow deflector the fluid stream entering the mixing chamber through the entry means is divided to form a flow path through the aperture means and an outer peripheral flow path between the deflector means and the wall of the mixing chamber.

BRIEF DESCRIPTION OF THE DRAWINGS

FIG. 1 is a schematic illustration of a preferred system for practicing the continuous fluidized bed polymerization of monomers in accordance with the invention;

FIG. 2 is an elevational view in cross section of the lower portion of the reactor including the distributor plate means, the mixing chamber, flow deflector means;

FIG. 2A is a top view of the flow deflector means as viewed along line 2a—2a of FIG. 2;

FIG. 3 is an enlarged partial elevational view in cross section of the entry means and flow deflector means of FIG. 2;

BEST MODE FOR CARRYING OUT THE INVENTION

Figure 4:
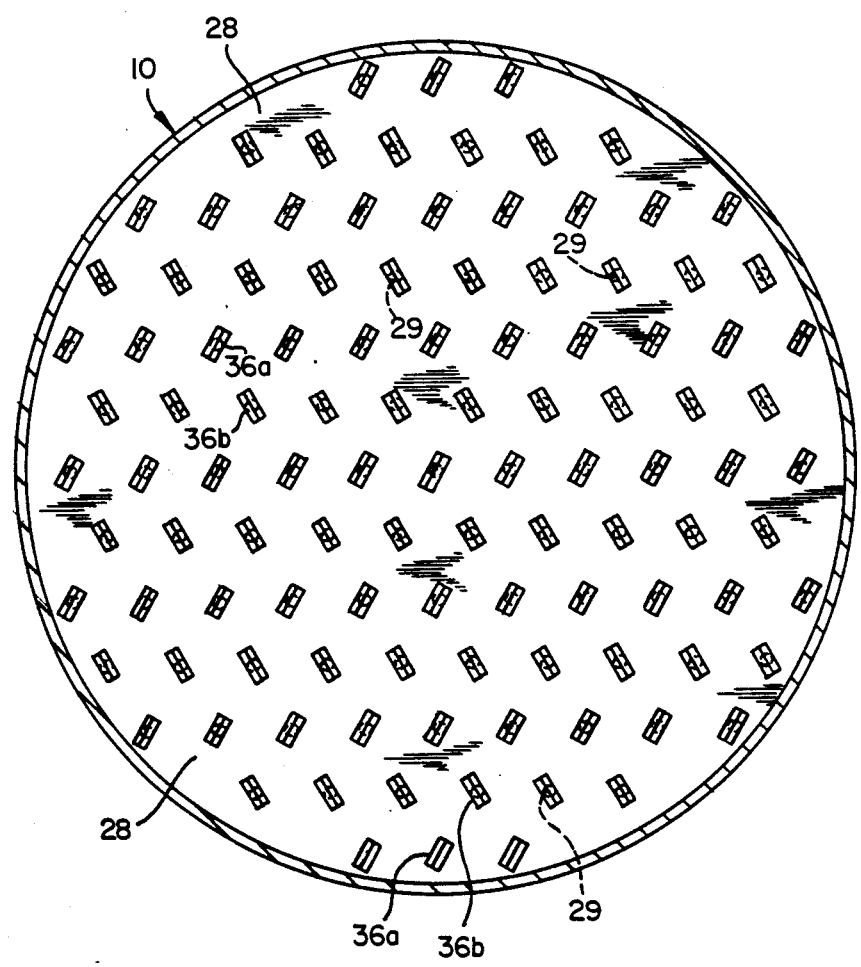
FIG. 4 is a top view of the distributor plate as viewed along line 4—4 of FIG. 2 showing an orientation of cap means positioned thereon.

In a continuous fluidized bed polymerization reactor a distributor plate is provided below the fluidized bed which supports the bed and provides gas distribution across the fluidized bed. The distributor plate also serves to define a mixing chamber in the region of the reactor below the distributor plate. The primary function of the mixing chamber is to ensure that the gases and entrained condensed liquid (if any) are distributed across the full cross-section of the chamber by the time the gas stream passes through the ports of the distributor plate at the base of the fluidized bed. Typically, when operating in a condensing mode of operation, some separation of the entrained liquid occurs on the surfaces of the fluid conduit through which the recycled stream enters into the reactor (primarily due to inertial impaction on the walls of the recycle conduit). To obtain sufficiently uniform entrainment and distribution it is important that any separated liquid present in the mixing chamber be re-entrained and mixed. This should be accomplished such that the gas stream passing through the ports of the distributor plate means into the fluidized bed is of the desired uniformity. The flow deflector means of the present invention provides the desired distribution.

As shown schematically by arrows in FIGS. 2 and 3 of the drawings, in the preferred embodiment therein disclosed, the recycle gas stream is divided into a centrally disposed, upwardly oriented stream flowing through a central aperture in the annular flow deflector (annulus) and an outer stream passing peripherally or laterally around the annular flow deflector. The annular outer stream passes peripherally around the annular flow deflector and sweeps the wall of the mixing chamber; inhibiting the build-up of solid material (resin) thereon. It should be understood that a small amount of solids is generally entrained in the recycle fluid. As indicated by the arrows, the centrally disposed, upwardly oriented stream and the peripheral stream mix or commingle to provide the desired more uniform distribution of any liquid and/or solid material in the gas stream.

The parameters set out in Table 1 below serve to delineate operable conditions for providing the desired flow characteristics.

TABLE 1

| Range | Preferred Value |
|---|---|
| (1) $0.1 \leq A_2/A_1 \leq 0.75$ | 0.3 | wherein $A_1$ = the area through which the stream of fluid passes in following the first flow path along the wall of the mixing chamber (curtain area), and $A_2$ = the area of the aperture(s) through which the upwardly oriented stream flows in following the second flow path, and wherein, for the preferred annular flow deflector means in FIGS. 2 and 3:

$$\text{area of aperture} = \frac{\pi d_i^2}{4}$$

where $d_i$ = the diameter of the central orifice; and curtain area = $\pi d_o h$ where $d_o$ is the outside diameter of the annular flow deflector and h is the minimum distance from the lower outer edge of the annular disc to the mixing chamber wall.

In defining the curtain area it is assumed that the supports or spacers 32a (see FIGS. 2 and 3) are of limited or negligible size in relation to the open area in the "curtain" area and can be ignored for purposes of the relationship set out above. That is, in the preferred mode disclosed in FIGS. 2 and 3, the spacers occupy a relatively small part of the curtain area.

| | | Preferred Value |
|---|---|---|
| (2) $0.5 \leq \dfrac{Z}{\text{minimum clearance between the flow deflector and the inside wall of the mixing chamber}} \leq 5$ | | 2 | wherein Z is the horizontal distance between the top inside edge of the entry pipe and the outer tip of the flow deflector, and wherein, for the annular flow deflector of FIGS. 2 and 3:

$$0.5 \leq \frac{d_o - d_e}{2h} \leq 5,$$

since, for the annular flow deflector, Z is $$\frac{d_o - d_e}{2},$$

where $d_o$ is as defined above and $d_e$ is the diameter of the entry means (inlet pipe or recycle line 22 in FIG. 2).

|  | Preferred Range |
| --- | --- |
| (3) $H_v > 0.05$ psi | $H_v > 0.2$ psi | wherein $H_v$ is the velocity head based on the total flow deflector flow area with the total flow deflector flow area defined as the sum of: the area of the first flow path along the wall of the mixing chamber (the curtain area) plus the area of the aperture(s) of the second flow path through which the upwardly oriented stream passes and wherein:

$$H_v = \rho_g V_G^2 / 9266^{**},$$

where $\rho_g$ is the density of the gas (lb/ft$^3$); and the gas velocity ($V_G$) in ft/sec is:

$$V_G = 144 W_G / A_D \rho_g,$$

where $W_G$ is the mass flow rate (lb/sec) of gas entering the deflector and, for the system of FIGS. 2 and 3, the total deflector open area, $$A_D = \pi d_i^2/4 + \pi d_o h.$$

** The cross-sectinal area of the aperture(s) ($A_2$) should not exceed about ⅔ of the cross-sectional area of the entry means.

It is to be noted that $d_i$, $d_o$ and $h$ are measured in inches.

Under such conditions of operation, the resultant velocities of the central and annular or peripheral streams and their relative mass flow rates assure intimate mixing of the streams and continued suspension of entrained liquid and solids in the upwardly flowing gas stream entering into the fluidized bed through the distribution plate means. It has been found that there is no permanent disentrainment of liquid droplets or solids out of the gas streams under these operating conditions. Nor is there undesirable liquid flooding of the mixing chamber or solids (resin) buildup therein, which can result with disentrainment of liquid and solids, respectively.

In accordance with the invention, by maintaining the relationship between relative mass flow rates and velocities in the upwardly oriented fluid stream and the stream in the fluid flow path along the wall, the desired positive flow in both paths is obtained and the desired level of mixing in the mixing chamber is achieved.

The mixing chamber should generally have a length-to-width (diameter) ratio of up to about 1.5 and preferably from about 0.7 to about 1.0. Similarly, the ratio of the diameter of the mixing chamber to the diameter of the fluid entry means (inlet or conduit) to the reactor is generally less than or equal to about 10:1, preferably in the range of from about 5:1 to about 8:1.

Additionally, when operating in the condensing mode of operation, the ratio of the superficial gas velocity ($U_m$), in the mixing chamber, to the terminal gas velocity in the condensing mode of operation in the lower mixing chamber ($U_1$), as defined below, should preferably be at least 0.18:1.

A ratio of $U_m/U_1$ of at least 0.18:1 reduces the likelihood of flooding and frothing in the lower regions of the mixing chamber. $U_m$ represents the superficial gas velocity in the chamber and $U_1$ represents the limiting gas velocity, i.e., the gas velocity above which drops of entrained liquid are subdivided and the entrained liquid is carried upward with the gas stream. The latter velocity may be represented (in dimensionally consistent units) as follows:

$$U_1 = 2.0(g\sigma_1 \Delta\rho/\rho_g^2)^{0.25}$$

where:
g is the gravitational acceleration;
$\sigma_1$ is the surface tension of the liquid;
$\Delta\rho$ is the density difference between the liquid and the gas; and
$\rho_g$ is the density of the gas.

In general for the condensing mode of operation it has been determined that the weight fraction of condensed liquid entrained in the recycle gas stream may range up to about 0.2 (20 weight percent), preferably from about 2 to about 20 weight percent, the particular weight percent being dependent on the particular polymer being produced.

A fluidized bed reaction system which is particularly suited for the production of polyolefin resins in accordance with the present invention is illustrated in the drawings. With specific reference to FIG. 1, reactor 10 comprises a reaction zone 12 and a velocity reduction zone 14.

In general, the height-to-diameter ratio of the reaction zone will lie in the range of from about 2.7:1 to about 4.6:1. The range can vary to larger or smaller ratios dependent upon the desired production capacity. The cross-sectional area of the velocity reduction zone 14 is typically within the range of about 2.6 to about 2.8 multiplied by the cross-sectional area of the reaction zone 12.

The reaction zone 12 includes a bed of growing polymer particles, formed polymer particles and a minor amount of partially or totally activated precursor composition and/or catalyst (hereinafter collectively referred to as catalyst), all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization, which is typically from about 0.2 to about 0.5 feet per second. Preferably, the SGV is at least 0.2 feet per second above the minimum flow required for fluidization, i.e., typically from about 0.4 to about 0.7 feet per second. Ordinarily, the SGV will not exceed 5.0 feet per second and it is usually no more than 2.5 feet per second.

Particles in the bed help to prevent the formation of localized "hot spots" and to entrap and distribute the particulate catalyst throughout the reaction zone. Accordingly, on start up, the reactor is charged with a base of particulate polymer particles before gas flow is initiated. Such particles may be the same as the polymer to be formed or different. When different, they are withdrawn with the desired newly formed polymer particles as the first product. Eventually a fluidized bed consisting of desired polymer particles supplants the start-up bed.

The catalysts used are often sensitive to oxygen, thus the catalyst used to produce polymer in the fluidized bed is preferably stored in a reservoir 16 under a blanket of a gas which is inert to the stored material, such as nitrogen or argon.

Fluidization is achieved by a high rate of fluid recycle to and through the bed, typically on the order of about 50 times the rate of feed of make-up fluid. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid is fed to the reactor system at point 18 via recycle line 22. The composition of the recycle stream is measured by a gas analyzer 21 and the composition and amount of the make-up stream is then adjusted accordingly to maintain an essentially steady state gaseous composition within the reaction zone.

The gas analyzer is a conventional gas analyzer which operates in conventional manner to indicate recycle stream composition and which is adapted to regulate the feed and is commercially available from a wide variety of sources. The gas analyzer 21 can be positioned to receive gas from a point between the velocity reduction zone 14 and the heat exchanger 24, preferably, between the compressor 30 and heat exchanger 24.

If desired, other additives may be added to the recycle line 22 through line 40 from a suitable dispenser 38.

To ensure complete fluidization, the recycle stream and, where desired, part of the make-up stream are returned through recycle line 22 to the reactor at point 25 below the bed. Preferably there is a gas distributor plate 28 above the point of return to aid in fluidizing the bed uniformly and to support the solids particles prior to startup or when the system is shut down. The stream flowing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

In very general terms, a conventional fluidized bed process for producing resins, particularly polymers produced from monomers, is practiced by passing a gaseous stream containing one or more monomers continuously through a fluidized bed reactor under reactive conditions and in the presence of catalyst at a velocity sufficient to maintain the bed of solids particles in a suspended condition. The gaseous stream containing unreacted gaseous monomer is withdrawn from the reactor continuously, compressed, cooled and recycled into the reactor. Product is withdrawn from the reactor and make-up monomer is added to the recycle stream. In the course of sweeping the gaseous stream through the fluidized bed reactor to maintain the bed in a suspended condition, a minor portion of the solids particles present in the bed may be carried out of the reactor with the gaseous stream which is recycled to the reactor. Since these particles are hot and contain catalyst, they will continue to grow by further reaction with monomer gas as they are carried through the recycle system, potentially causing problems by settling out and agglomerating into a solid mass or sticking to the walls of the recycle line and heat exchanger. This may ultimately lead to plugging of the recycle lines or heat exchanger, necessitating shutdown. Accordingly, it is important to minimize the carryover of particles in the recycle stream.

While virtually all solid particle carryover can be eliminated, the penalty to accomplish this is substantially increased capital cost for auxiliary equipment, e.g., cyclones, and the increased cost for the maintenance and operation of this auxiliary equipment. Since a minor amount of solid particle carryover in the recycle stream is manageable, it is preferred to accept a minimal amount of solid particle carryover rather than to eliminate it completely. However, when operating in a condensing mode, in accordance with the subject invention, the additional problem of "mud", as is discussed in detail below, can occur.

The polymer-forming reaction is exothermic, making it necessary to maintain in some fashion the temperature of the gas stream inside the reactor at a temperature not only below the resin and catalyst degradation temperatures but at a temperature below the fusion or sticking temperature of resin particles produced during the polymerization reaction. This is necessary to prevent plugging of the reactor due to rapid growth of polymer chunks which cannot be removed in a continuous fashion as product. It will be understood, therefore, that the amount of polymer that can be produced in a fluidized bed reactor of a given size in a specified time period is directly related to the amount of heat which can be withdrawn from the fluidized bed.

When operating in the condensing mode of operation, the recycle gas stream is intentionally cooled to a temperature below the dew point of the recycle gas stream to form a mixture comprising a liquid phase and a gas phase and which may also contain a minor amount of solid particles.

When operating in the condensing mode, it may be desirable in some instances to raise the dew point of the recycle gas stream to further increase heat removal. The recycle stream dew point can be increased by: (1) raising the operating pressure of the reaction system, (2) increasing the concentration of condensible fluids in the recycle stream, and/or (3) reducing the concentration of non-condensible gases in the recycle stream. For example, the dew point of the recycle stream may be increased by the addition of a condensible fluid to the recycle stream which is inert to the catalyst, reactants, and the products of the polymerization reaction. The fluid can be introduced into the recycle stream with the make-up fluid or by any other means or at any other point in the system. Examples of such fluids are saturated hydrocarbons, such as butanes, pentanes or hexanes.

A primary limitation on the extent to which the recycle gas stream can be cooled below the dew point is in the requirement that the gas-to-liquid ratio be maintained at a level sufficient to keep the liquid phase of the mixture in an entrained or suspended condition until the liquid is vaporized. It is also necessary that the velocity of the upwardly flowing fluid stream immediately above the gas distributor plate be sufficient to maintain the fluidized bed in a suspended condition.

The liquid content of the recycle stream can be quite high, but as a general rule the quantity of condensed liquid contained in the gas phase should not exceed about 20 weight percent at the point of passage through the distributor plate (based on the total weight of the recycle stream). When the liquid content is below 2 weight percent the benefit obtained is limited.

To the extent that solid particles are carried over in the gaseous stream exiting the reactor, it is important that the amount of liquid present in the recycle stream, when operating in the condensing mode, be sufficient to avoid forming "mud". Undesirable "mud" may result from wetting of solid particles, agglomeration, and disentrainment resulting in accumulation and deposition in regions of relatively low velocity in the system, e.g., in the heat exchanger or elsewhere in the recycle lines. The amount of solids in the gaseous stream exiting the reactor is typically small, e.g., from about 0.1 to about 0.5 weight percent (based on the total weight of the stream). However, larger amounts, on the order of 1 weight percent or higher, may occur. Since the ratio of liquid to solid particles at which mud can form is somewhat variable (based, it is believed, at least in large part on particle shape and distribution), the weight ratio of liquid to solid particles in the recycle stream is maintained at not less than about two to one, preferably not less than about five to one, and more preferably not less than 10 to 1 to avoid this potential problem. The latter higher ratios provide protection against aberrations in operation which may result in transitory higher solids carryover in the gaseous stream exiting the reactor.

An excess of liquid serves to prevent the accumulation of solids in the system at any point in the system where they might otherwise settle out and to keep the system washed clean. In no event should the ratio fall below about two to one when the amount of liquid in the entering recycle stream is in the desired operating range of from 2 to about 20 weight percent. When operating in the non-condensing mode, i.e., without liquid in the recycle or with very low levels of liquid present, the ratio of liquid to solids particles in the recycle stream is not significant since the solids will not be wetted to any significant extent and the formation of mud is not a problem.

The recycle stream is compressed in a compressor 30 and then passed through a heat exchange zone where the heat of reaction is removed from the recycle stream before it is returned to the bed. The heat exchange zone may be a conventional heat exchanger 24 which can be of the horizontal or vertical type. The recycle stream exiting the heat exchange zone is returned to the reactor at point 25 and to the fluidized bed through mixing chamber 26a and gas distributor plate 28. In the preferred embodiment illustrated in FIGS. 1-3, the annular disc deflector means is positioned at a stand-off distance from the inlet to the reactor at the base of the mixing chamber of 26a.

The preferred annular flow deflector means, as shown in FIGS. 2 and 3 of the drawings, comprises an annulus 32 supported at a standoff distance (h) above the reactor inlet 26 by spacers 32a dividing the entering recycle stream into a central upward flow stream 33 and a peripheral annular flow stream 33a along the lower side wall of the reactor. The streams mix and pass through the protective screen 27, the holes or ports 29 of the distributor plate 28, and the angle caps 36a and 36b, secured to the upper surface of the distributor plate, and then into the fluidized bed. The flow is a mixture of gas and generally a small amount of solid particles (resin) for a non-condensing mode of reactor operation. For a condensing mode of reactor operation, the flow is a mixture of gas, liquid droplets, and generally some solid particles (resin).

The central upper flow stream 33 in the mixing chamber 26a assists in the entrainment of liquid droplets in the bottom head or mixing chamber and in carrying the entrained liquid to the fluidized bed section during a condensing mode of reactor operation. The peripheral flow 33a assists in limiting the build-up of solid particles in the bottom head during both modes of reactor operation because it sweeps the inner surface of the reactor wall. The peripheral flow also contributes to the re-atomization and re-entrainment of any liquid which may be disentrained at the wall or accumulate at the bottom of the mixing chamber during a condensing mode operation, especially with higher levels of liquid in the system. By providing both central upward and outer peripheral flow in the mixing chamber, the annulus 32 permits a reactor to be operated in either the condensing or the non-condensing mode without the problems of liquid flooding or excessive build-up of resin at the bottom of the reactor.

The temperature of the bed is basically dependent on three factors: (1) the rate of catalyst injection which controls the rate of polymerization and the attendant rate of heat generation, (2) the temperature of the gas recycle stream, and (3) the volume of the recycle stream passing through the fluidized bed. Of course, the amount of liquid introduced into the bed either with the recycle stream and/or by separate injection also affects the temperature since this liquid vaporizes in the bed and serves to reduce the temperature. Normally the rate of catalyst injection is used to control the rate of polymer production. The temperature of the bed is controlled at an essentially constant temperature under steady state conditions by constantly removing the heat of reaction. No noticeable temperature gradient appears to exist within the upper portion of the bed. A temperature gradient will exist in the bottom of the bed in a layer or region extending above the distribution plate, e.g., for about 6 to 12 inches, as a result of the difference between the temperature of the inlet fluid and the temperature of the remainder of the bed. However, in the upper portion or region above this bottom layer the temperature of the bed is essentially constant at the maximum desired temperature.

Good gas distribution plays an important role in the efficient operation of the reactor. The fluidized bed contains growing and formed particulate polymer particles, as well as catalyst particles. As the polymer particles are hot and possibly active, they must be prevented from settling for, if a quiescent mass is allowed to exist, any active catalyst present will continue to react and can cause fusion of the polymer particles resulting, in an extreme case, in the formation of a solid mass in the reactor which can only be removed with great difficulty and at the expense of an extended downtime. Since the fluidized bed in a typical commercial size reactor may contain many thousand pounds of solids at any given time, the removal of a solid mass of this size requires a substantial effort. Diffusing recycle fluid through the bed at a rate sufficient to maintain fluidization through the bed is, therefore, essential.

Gas distributor plate 28 is a preferred means for achieving good gas distribution. It may be a screen, slotted plate, perforated plate, a plate of the bubble-cap type, or the like. The elements of the plate may all be stationary or the plate may be of the mobile type disclosed in U.S. Pat. No. 3,298,792. Whatever its design, it must diffuse the recycle fluid through the particles at the base of the bed to keep the bed in a fluidized condition and also serve to support a quiescent bed of resin particles when the reactor is not in operation. Preferably, the protective screen 27 is positioned below the distributor plate 28 to reduce the likelihood of the plate being plugged by resin chips impinging on the plate as the gas recycle stream carries the chips upward.

The preferred type gas distributor plate 28 is generally of the type which is fabricated from metal and which has holes distributed across its surface. The holes are normally of a diameter of about one-half inch. The holes extend through the plate and over the holes there are positioned angle caps identified by reference numerals 36a and 36b in FIG. 1 which are fixedly mounted to plate 28. Alternate rows of angle irons are oriented at angles to each other, preferably at 60 degrees, in alternate parallel alignment as shown in FIG. 4. They serve to distribute the flow of fluid along the surface of the plate so as to avoid stagnant zones of solids. In addition, they prevent resin particles from falling through the holes when the bed is settled or quiescent.

The fluid bed reactor may be operated at pressures of up to about 1,000 psig and, for polyolefin resin production, preferably is operated at a pressure of from about 250 psig to about 500 psig.

The partially or totally activated catalyst is injected intermittently or continuously into the bed at a desired rate at a point 42 which is above the distributor plate 28. Preferably, the catalyst is injected at a point in the bed where good mixing with polymer particles occurs.

The catalyst can be injected into the reactor by various techniques. For ethylene polymerization it is preferred to continuously feed the catalyst into the reactor utilizing a catalyst feeder as disclosed, e.g., in U.S. Pat. No. 3,779,712. The catalyst is preferably fed into the reactor at a point 20 to 40 percent of the reactor diameter away from the reactor wall and at a height above the bottom of the bed equal to from about 5 to about 30 percent of the height of the fluidized bed.

A gas which is inert to the catalyst, such as nitrogen or argon, is preferably used to carry the catalyst into the bed.

The rate of polymer production in the bed depends on the rate of catalyst injection and the concentration of monomer(s) in the recycle stream. The production rate is conveniently controlled by simply adjusting the rate of catalyst injection.

As noted above, in order to minimize the problem of distributor plate pluggage, a mesh screen 27 is preferably installed below the plate to prevent the drilled holes in the plate from being plugged by resin chips (agglomerated solids) from the recycle stream.

Operations of the reactor with the annulus 32 has resulted in the desired level of mixing in the mixing chamber. In some instances, however, it was observed that some localized plugging of the distributor plate takes place. Generally, the pluggage is localized near the center of the distributor plate and is believed to be due to "chips" generated from the cooler and/or cycle line and carried into the bottom head by the cycle gas. Most of the "chips" are carried upward by the jet flow generated by the center opening of the annular disc, impinge on the distributor plate near the center, and plug the holes.

Thus in a most preferred embodiment, the flow deflector means includes a further flow deflector which is positioned above the annular disc.

Figure 7:
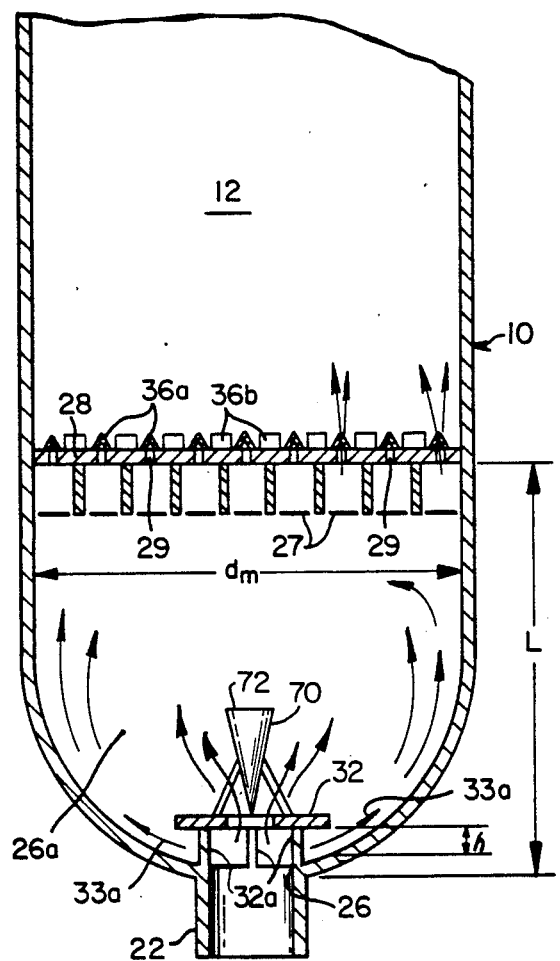
FIG. 7 is a partial elevational view in cross section illustrating a most preferred embodiment of the flow deflector means, including the annular disk in combination with a cone.
Figure 8A:
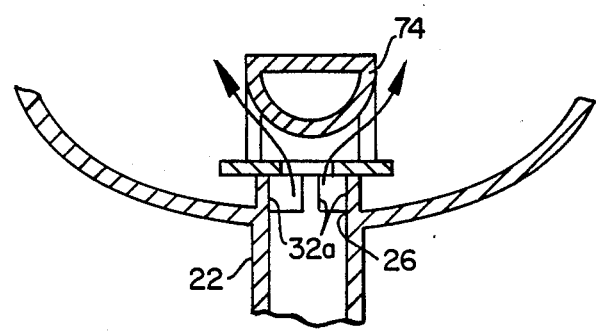
FIGS. 8A, 8B & 8C show alternate deflector means to replace the cone illustrated in FIG. 7.
Figure 8B:
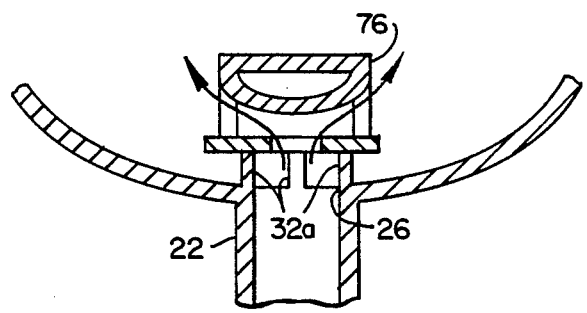
Figure 8C:
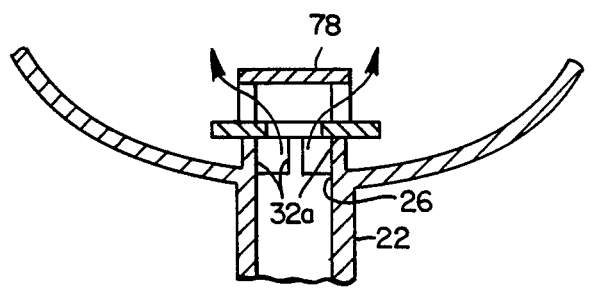

Referring to FIG. 7 it will be seen that the preferred type of flow deflector is illustrated as being in the shape of a cone 70 with the apex being preferably positioned above the surface of annular disc 32, although improved results have been observed even when the apex of the cone was positioned flush with the top surface of the annular disc 32. From the apex, the walls of the cone extend toward the base 72 at an angle of about 20°–80° preferably about 30° to 60°. The diameter of the base is preferably equal to the diameter of the opening of annular disc 32. It will of course be understood that the ultimate distance of the apex of the cone from the top of annular disc 32, the height of the cone i.e. the distance from the apex to the base, and the diameter of the base will depend on the type reactor being utilized and can easily be determined by one skilled in the art. Suffice it to state that the cone is positioned proximate and dimensioned so as to divert the jet flow generated by the center opening of the annular disc 32. Excellent results have been obtained when the cone has been positioned above the annular plate 2–3 times the diameter of the aperture of the center opening. By this technique, the cone will divert the jet flow and disperse the "chips and fines" evenly in the bottom heads of the reactor. Although the most preferred type of flow deflector is illustrated as a cone, other geometric configurations are also possible and provide improved results. Thus referring to FIGS. 8A, 8B and 8C wherein like parts are designated by like reference numerals, it will be seen that the shape of the flow deflectors can be hemispherical 74, hemiellipsoidal 76 or even flat 78.

On discharge of particulate polymer product from the reactor 10, it is desirable, and preferable, to separate fluid from the product and to return the fluid to the recycle line 22. There are numerous ways known to accomplish this. One system is shown in the drawings. Thus, fluid and product leave reactor 10 through line 44 and enter the product discharge tank 46 through a valve 48 which is designed to have minimum restriction to flow when opened, e.g., a ball valve. Positioned above and below product discharge tank 46 are conventional valves 50, 52 with the latter being adapted to provide passage of product into a product surge tank 54. Product surge tank 54 has venting means illustrated by line 56 and gas entry means illustrated by line 58. Also positioned at the base of product surge tank 54 is a discharge valve 60 which, when in the open position, discharges product for conveying to storage. Valve 50, when in the open position, releases fluid to surge tank 62. Fluid from the product discharge tank 46 is directed through a filter 64 and thence through a surge tank 62, a compressor 66 and into recycle line 22 through line 68.

In a typical mode of operation, valve 48 is open and valves 50, 52 are in a closed position. Product and fluid enter product discharge tank 46. Valve 48 closes and the product is allowed to settle in product discharge tank 46. Valve 50 is then opened, permitting fluid to flow from product discharge tank 46 to surge tank 62 from which it is continually compressed back into recycle line 22. Valve 50 is then closed and valve 52 is opened and product in the product discharge tank 46 flows into the product surge tank 54. Valve 52 is then closed. The product is purged with inert gas, preferably nitrogen, which enters the product surge tank 54 through line 58 and is vented through line 56. Product is then discharged from product surge tank 54 through valve 60 and conveyed through line 20 to storage.

Another more preferred product discharge system which may be employed in the alternative is that disclosed and claimed in the copending U.S. Patent Application of Robert G. Aronson, filed Jul. 28, 1981, Ser. No. 287,815 and entitled "Fluidized Bed Discharge Process" (published as EPA Application No. 0071430 on Feb. 9, 1983). Such a system employs at least one pair of tanks (and more preferably two pairs of tanks in parallel) comprising a settling tank and a transfer tank arranged in series and having the separated gas phase returned from the top of the settling tank to a point in the reactor near the top of the fluidized bed.

In the basic embodiment of the system for conducting the process of the invention, the reaction vessel contains a bed of fluidized solid particles with a gas stream entering an inlet line at the bottom and leaving through a vent line at the top. A vented settling tank, located externally and preferably below the fluidized bed, is connected to the bed by a discharge line and a vent line. The vent line is directly connected to the reaction vessel near the top level of fluidized bed and the solids discharge line is connected to the lower part of the vessel, preferably near the distributor plate. A transfer tank is located below and is connected to the bottom of the settling tank by a line and is connected to downstream processing equipment through a discharge line. Initially, the reaction vessel and settling and transfer tanks are isolated from each other and from downstream equipment by valves. Solids and gas are discharged from the reaction vessel into the settling tank by opening discharge and vent line valves while keeping the settling tank outlet valve closed. The settling tank pressure initially increases to approximately that in the bottom of the reaction vessel and then the differential pressure across the fluidized bed of solids is the driving force for solids and gas to flow through the discharge line. A portion of this fluidizing gas and solids flows through discharge line to the settling tank because of the lower resistance flow path compared to the flow path through the fluidized bed of solids. The solids and gas separate in the settling tank and the gas is returned to the reaction vessel through the vent line by displacement with additional solids and gas entering the settling tank. After the settling tank fills with settled solids and some gas, the settling tank is isolated from the reaction vessel by closing the discharge and vent line valves. The solids are then transferred, by pressure differential and by gravity, from the settling tank to the transfer tank through a line by opening the valve therein. With the solids in the transfer tank and the tank pressures equalized, the line valve is closed. The settling tank is now ready to start another discharge cycle or it can wait until the transfer tank is finished transferring the solids to downstream equipment. Solids are then transported from the transfer tank to downstream equipment at lower pressure by opening the outlet valve. Solids transfer can be by conventional solids handling equipment or by high pressure conveying using the pressurized gas that is entrained with the solids (additional gas may be required). After the solids are transported from the transfer tank, the outlet valve is closed and the transfer tank is ready for another cycle.

In an alternate and preferred embodiment, solids are intermittently discharged from a high pressure vessel containing a fluidized bed of solids using a process that employs two pairs of the basic settling and transfer tanks operated in parallel and operating sequentially with gas vented from the solids prior to discharging the solids to a lower pressure. A first vented settling tank serves to receive solids and gas discharged from the fluidized bed. After the tank fills with solids, some of the gas entrained with the solids is vented to a second settling tank (in the parallel pair system) which serves as a temporary gas receiver, later indirectly venting to the reaction vessel. The solids are then transferred from the settling tank to a lower pressure transfer tank while minimizing gas losses. The discharge operation is continued alternating between parallel settling tanks in receiving a solids and gas stream from the fluidized bed.

The fluidized-bed reactor is equipped with an adequate venting system (not shown) to allow venting the bed during startup and shutdown. The reactor does not require the use of stirring and/or wall scraping. The recycle line 22 and the elements therein (compressor 30, heat exchanger 24) should be smooth surfaced and devoid of unnecessary obstructions so as not to impede the flow of recycle fluid or entrained particles.

EXAMPLES

A commercial fluidized bed olefin polymerization reactor, in the bottom of which an annular flow deflector means of the type shown in FIGS. 2 and 3 of the drawings was employed, has been operated in both condensing and non-condensing modes without problems. The dimensions were as follows: $d_m = 11.5$ feet (3.51 m) mixing chamber diameter; $L = 8.3$ feet (2.54 m) mixing chamber height; $d_e = 23$ inches (0.58 m) inlet diameter; $d_o = 38$ inches (0.97 m) outer deflector diameter; $d_i = 13.9$ inches (0.35 m) inner deflector diameter; and $h = 3.9$ inches (0.10 m) deflector stand off distance. Four spacers were used to support the annulus and to maintain the stand off distance clearance (h) between the outer edge of the annulus and the reactor bottom. For this annular disc, $A_2/A_1$ was 0.33, $Z/h$ was 1.9 and $H_v$ was 1.0 psi.

The reactor has been used to produce ethylene copolymers in both the condensing and the non-condensing modes and ethylene homopolymers in the non-condensing mode. Depending upon the products produced, the reactor conditions can be, for example:

Reactor temperature, $T_{bed}$: 89–95 degrees C.;

Reactor pressure, $P_{bed}$: 300–305 psig (20.7–21.0 bar);

$U_s$: 1.8–2.3 feet per second (0.55–0.70 meters per second) where Us is the superficial gas velocity in the fluidized bed Fluidized bed height, $H_{fb}$: 39 feet (11.9 meters);

Maximum rate of condensation experienced at the reactor inlet, $W_{max}$: 11 weight percent;

Reactor production rate: 21,000–40,000 pounds per hour (9,526–18,145 kilograms per hour).

No problem of reactor operation and no adverse effect on the quality of products, attributable to the flow deflector means were observed. Even at the highest rate of condensation (11 weight percent at the reactor inlet) that the reactor experienced, there was no reactor operational instability during the run. This indicated that, at that level of condensation, the liquid was well entrained and carried into the fluidized bed as droplets without accumulating in the bottom head and flooding. The reactor was inspected often and no fouling due to excessive build-up of resin solids was observed. The inner surfaces were found to be clean, even cleaner than in the case of utilizing the conventional standpipe/conical cap-type reactor inlet. Accordingly, the use of flow deflector means in accordance with this invention provides a method for operating in both the condensing and non-condensing modes of operation without adversely affecting the properties or quality of the products.

The following Tables set forth examples of the production by polymerization of ethylene polymers employing either the condensing or non-condensing mode of operation. The commercial polymerization reactor employed was the reactor described immediately above. The runs were carried out to produce the products listed in Table 2 in the mode of operation therein stated and with the amount of condensation stated. The full operating conditions for the two runs are in the data set forth in Table 3.

TABLE 2

| Run | Product | Mode of Operation | Amount of Liquid in the gas stream at the Reactor Inlet (Weight Percent) |
|---|---|---|---|
| I | Hexene copolymer of ethylene | Condensing | 9–10 |
| II | Butene copolymer of ethylene | Non-condensing | 0 |

TABLE 3

| Run | I | II |
|---|---|---|
| ΔP bottom* (psi) | 5.2 | 5.0 |
| ΔP cooler (psi) | 6.0 | 6.5 |
| $T_{bed}$ (°C.) | 95.0 | 89.0 |
| $P_{bed}$ (psig) | 305.0 | 305.0 |
| $U_i$ (ft/sec) (inlet velocity) | 79.2 | 79.2 |
| $U_S$ (ft/sec) (superficial gas velocity in the fluidized bed) | 2.2 | 2.2 |
| $L_{fb}$ (ft) (fluidized bed height) | 39.0 | 39.0 |
| L (ft) (diffusion mixing chamber height) | 8.33 | 8.33 |
| $D_m$ (ft) (diffusion mixing chamber diameter) | 11.5 | 11.5 |
| Production rate (KPPH) | 40.0 | 22.0 |
| Space time yield (lb/ft³hr) | 9–10.0 | 5.4 |
| MI (melt index) | 0.83 | 100.0 |
| MFR (melt flow ratio) | 25.0 | 27.0 |
| ρ(g/cc) | 0.926 | 0.931 |
| Ash (%) | 0.042 | 0.040 |
| ρb (lbm/ft³) (bulk density) | 27.0 | 24.5 |
| APS (in) (average particle size) | 0.027 | 0.0226 |

Figure 5:
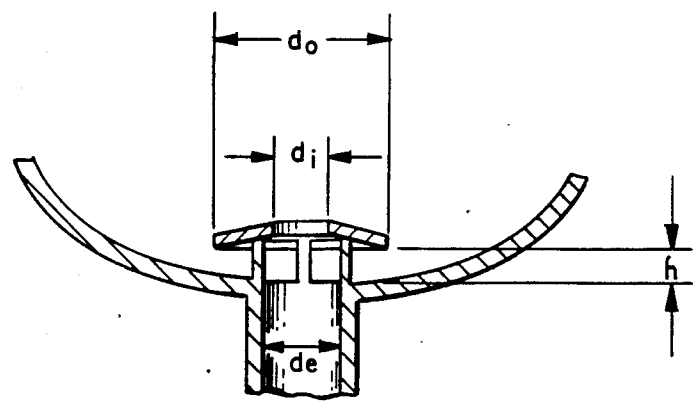
FIG. 5 is a partial elevational view in cross section of the entry portion of the reactor showing an alternative embodiment of the flow deflector means to that of FIG. 3.
Figure 6:
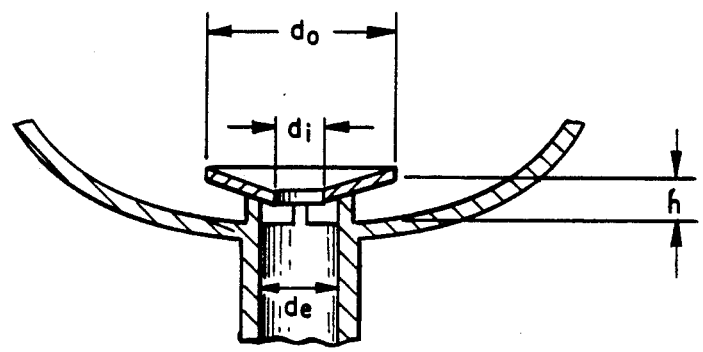
FIG. 6 is a partial elevational view in cross section of the entry portion of the reactor showing still another alternative embodiment of the flow deflector means.

*ΔP bottom denotes pressure drop across the flow deflector means plus the pressure drop across the distributor plate.
Note:
I = Hexene copolymer of ethylene
II = Butene copolymer of ethylene As shown in FIGS. 5 and 6 of the drawings, the flow deflector means need not be planar and oriented in a horizontal plane (as is the preferred flow deflector means illustrated in FIGS. 2 and 3). For example, the flow deflector means illustrated in FIGS. 5 and 6 may be substituted for the preferred flow deflector means in FIG. 2 in which event the flow deflector means are convex and concave with respect to the distributor plate, respectively. In a manner similar to that of the flow deflector means illustrated in FIGS. 2 and 3, the flow deflector means of FIGS. 5 and 6 when positioned over the bottom entry means 26 both provide a first fluid flow path along the wall of the mixing chamber and a second central, upwardly oriented fluid flow path through the central aperture of the flow deflector means.

The vertical height or thickness of the deflector means is not critical and need be only as thick as structural demands of reactor construction require. A relatively thin deflector means will function with essentially the same result as one of considerable thickness. Thus, in addition to the lack of criticality in the generally horizontal arrangement of the flow deflector means and its ability to operate successfully both with or without a concave or convex shape, the thickness of the flow deflector means has also not been found to be critical.

Although the base or bottom head of a commercial fluidized bed reactor is generally either an ellipsoidal or hemispherical dish which is connected with a straight section, other configurations may also be used with this invention. For example, the bottom head of the reactor may have a diverging conical shape and still be able to use the flow deflector concept. It is to be noted that the flat and convex annular flow deflectors as illustrated in the drawings are preferable to the concave annular flow deflectors for the ellipsoidal and hemispherical bottom reactors.

INDUSTRIAL APPLICABILITY

The subject invention finds use in a variety of fluidized bed polymerization reactor systems. It has applicability in the operation of fluidized bed reactors where it is necessary or desirable to switch from a condensing mode to a non-condensing mode of operation or vice versa. the invention finds particular applicability in the fluidized bed polymerization of polyolefins, e.g., polyethylene and polypropylene and their comonomers.

What is claimed is:
1. A fluidized bed polymerization reactor which comprises:
   A. a generally cylindrical vessel having a longitudinal axis:
   B. distributor plate means positioned in said vessel, generally perpendicular to said longitudinal axis of said vessel, defining a fluidized bed region above said distributor plate means and a mixing chamber region below said distributor plate means;
   C. inlet means for continuously introducing a stream of polymerizable fluids into said mixing chamber at a gas velocity sufficient to maintain particles in said fluidized bed region in suspended and fluidized condition;
   D. outlet means for continuously removing unreacted polymerizable gases from said fluidized bed region;
   E. catalyst injection means for introducing polymerization catalyst into said fluidized bed region;
   F. product removal means for removing solid particulate polymer product from said fluidized bed region; and
   G. at least one flow deflector means associated with said inlet means and being constructed and arranged with respect to said inlet means and being, adapted to divide said stream of polymerizable fluid flowing through said inlet means into two or more streams flowing in at least two fluid flow paths of which at least one flow path is directed upwardly and outwardly along the wall of said mixing chamber and at least one flow path is directed generally upwardly along a central axis of said mixing chamber, the division of said stream being such that the velocity of fluid flowing upwardly along the walls of said mixing chamber is sufficient to (1) entrain solid particles and liquid droplets and maintain particles in the fluid entrained and (2) inhibit the build-up of solid particulate polymer product on the wall of said mixing chamber and the velocity of fluid flowing up- wardly along a central axis of said mixing chamber being sufficient to prevent solid particulate polymer product from falling into said inlet means; the accumulation of liquid in the said mixing chamber is also inhibited; and the combined overall velocity and direction of said fluid flowing in said flow paths being such that sufficient mixing is provided to ensure the general uniformity and distribution of polymerizable fluids entering the said fluidized bed region.

2. In a fluidized bed polymerization reactor having distributor plate means below a fluidized bed region defining a mixing chamber within said reactor in the region below said distributor plate means and one or more entry means at or near the base of said reactor for passage of fluid into said reactor and through said mixing chamber, the improvement which comprises at least one flow deflector means defining a curtain area ($A_1$) below said at least one flow deflector means and being positioned in said mixing chamber and associated with at least one of said entry means, said at least one flow deflector means being constructed and arranged with respect to said at least one said entry means to provide at least two fluid flow paths for said fluid entering said mixing chamber, a first fluid flow path along a wall of said mixing chamber, and a second upwardly oriented fluid flow path wherein, in operation, solid particles and liquid droplets, if any, in or coming into said second flow path are carried upward; the wall of said mixing chamber is swept to inhibit the build-up of such solid particles; and the accumulation of liquid in said mixing chamber is also inhibited, said at least one flow deflector means having a lower outer edge and includes aperture means ($A_2$) and is generally annular in shape and positioned over said entry means at a stand-off distance whereby said first fluid flow path passes through said curtain area below said at least one flow deflector means and said second flow path passes through said aperture means in said at least one flow deflector means; and wherein the ratio of the area of said aperture means ($A_2$) to the area of said curtain area ($A_1$) satisfies the relationship:

$$0.1 \leq A_2/A_1 \leq 0.75; \text{ and}$$

$$0.5 \leq (d_o - d_e)/2h \leq 5$$

where $d_o$ is the diameter of said flow deflector means, $d_e$ is the diameter of said entry means, and h is the minimum distance from said lower outer edge of said at least one flow deflector means to the mixing chamber wall and wherein, in operation, $H_v > 0.05$ psi, where $H_v$ is the velocity head based on total flow deflector flow area.

3. A fluidized bed reactor in accordance with claim 2, wherein the ratio $A_2/A_1$ is about 0.3 and $(d_o - d_e)/2h$ is about 2 and wherein, in operation, $H_v > 0.2$ psi.

* * * * *